(12) United States Patent
Herbert

(10) Patent No.: US 10,111,404 B1
(45) Date of Patent: Oct. 30, 2018

(54) PET GROOMING TUNNEL

(71) Applicant: Mary Ann Herbert, Old Bethpage, NY (US)

(72) Inventor: Mary Ann Herbert, Old Bethpage, NY (US)

( * ) Notice: Subject to any disclaimer, the term of this patent is extended or adjusted under 35 U.S.C. 154(b) by 113 days.

(21) Appl. No.: 15/257,009

(22) Filed: Sep. 6, 2016

(51) Int. Cl.
  *A01K 13/00* (2006.01)
  *A46B 9/02* (2006.01)
  *A46B 15/00* (2006.01)

(52) U.S. Cl.
  CPC .......... *A01K 13/004* (2013.01); *A01K 13/002* (2013.01); *A46B 9/02* (2013.01); *A46B 15/0097* (2013.01)

(58) Field of Classification Search
  USPC ............... 119/622, 600, 621, 625, 652, 664, 119/602–606, 611, 484, 482; D30/158, D30/159
  See application file for complete search history.

(56) References Cited

U.S. PATENT DOCUMENTS

| | | | |
|---|---|---|---|
| 642,399 A * | 1/1900 | White et al. | |
| 1,568,226 A * | 1/1926 | Larson | A01K 13/004 119/622 |
| 1,582,144 A * | 4/1926 | Pflaum | A01K 13/004 119/658 |
| 1,627,516 A * | 5/1927 | Larson | A01K 13/004 119/656 |
| 2,380,842 A * | 7/1945 | Heese | A01K 13/004 119/658 |
| 2,721,538 A | 10/1955 | Latham | |
| 2,865,329 A * | 12/1958 | Elliott | A01K 13/002 119/622 |
| 2,976,841 A * | 3/1961 | Scheffer | A01K 13/002 119/622 |
| 3,455,313 A * | 7/1969 | King | A61H 3/00 135/67 |
| 4,301,766 A * | 11/1981 | Piccone | A01K 1/035 119/482 |
| 4,938,169 A | 7/1990 | Barmakiam | |
| 5,579,720 A | 12/1996 | Udelle | |
| 5,755,183 A * | 5/1998 | Udelle | A01K 13/002 119/622 |
| D501,063 S | 1/2005 | Bertoli | |
| D506,582 S * | 6/2005 | Madden | 119/621 |
| 7,444,959 B2 | 11/2008 | Hensley | |
| 8,720,988 B1 * | 5/2014 | Underwood | A47D 1/004 248/435 |
| 9,078,413 B1 * | 7/2015 | Docy | A01K 13/001 |

(Continued)

FOREIGN PATENT DOCUMENTS

WO  2009094108 A1  7/2009

*Primary Examiner* — Andrea M Valenti

(57) ABSTRACT

The pet grooming tunnel is a device that is adapted to brush hair or fur of an animal. The pet grooming tunnel is constructed of a ring member that includes a plurality of brush bristles provided on an inner surface. The ring member is supported in a vertical orientation via support legs provided on opposing sides of the ring member. The support legs are each vertically, adjustable so as to raise and lower the ring member with respect to a support surface. The plurality of brush bristles are concentrically oriented. An alternative embodiment includes a wider ring member wherein the plurality of brush bristles form a truncated conical opening.

1 Claim, 5 Drawing Sheets

(56) References Cited

U.S. PATENT DOCUMENTS

| | | | |
|---|---|---|---|
| 9,591,831 B2 * | 3/2017 | Chura | A01K 13/002 |
| 2002/0078902 A1 * | 6/2002 | Ehrmann | A01K 13/002 |
| | | | 119/625 |
| 2007/0039558 A1 * | 2/2007 | Hensley | A01K 13/004 |
| | | | 119/621 |
| 2012/0137984 A1 | 6/2012 | Haaf | |
| 2012/0222627 A1 | 9/2012 | Chura | |
| 2013/0269626 A1 * | 10/2013 | Navran | A01K 15/024 |
| | | | 119/621 |

* cited by examiner

PET GROOMING TUNNEL

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of pet grooming devices, more specifically, a tunnel that a pet is configured to enter into in order to brush the fur or hair of the pet.

SUMMARY OF INVENTION

The pet grooming tunnel is a device that is adapted to brush hair or fur of an animal. The pet grooming tunnel is constructed of a ring member that includes a plurality of brush bristles provided on an inner surface. The ring member is supported in a vertical orientation via support legs provided on opposing sides of the ring member. The support legs are each vertically, adjustable so as to raise and lower the ring member with respect to a support surface. The plurality of brush bristles are concentrically oriented. An alternative embodiment includes a wider ring member wherein the plurality of brush bristles form a truncated conical opening.

It is an object of the invention to provide a device that is adapted to brush the fur or hair of an animal.

An even further object of the invention is to provide a device that enables the animal to brush itself via walking through the apparatus forming the invention.

These together with additional objects, features and advantages of the pet grooming tunnel will be readily apparent to those of ordinary skill in the art upon reading the following detailed description of the presently preferred, but nonetheless illustrative, embodiments when taken in conjunction with the accompanying drawings.

In this respect, before explaining the current embodiments of the pet grooming tunnel in detail, it is to be understood that the pet grooming tunnel is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the pet grooming tunnel.

It is therefore important that the claims be regarded as including such equivalent construction insofar as they do not depart from the spirit and scope of the pet grooming tunnel. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
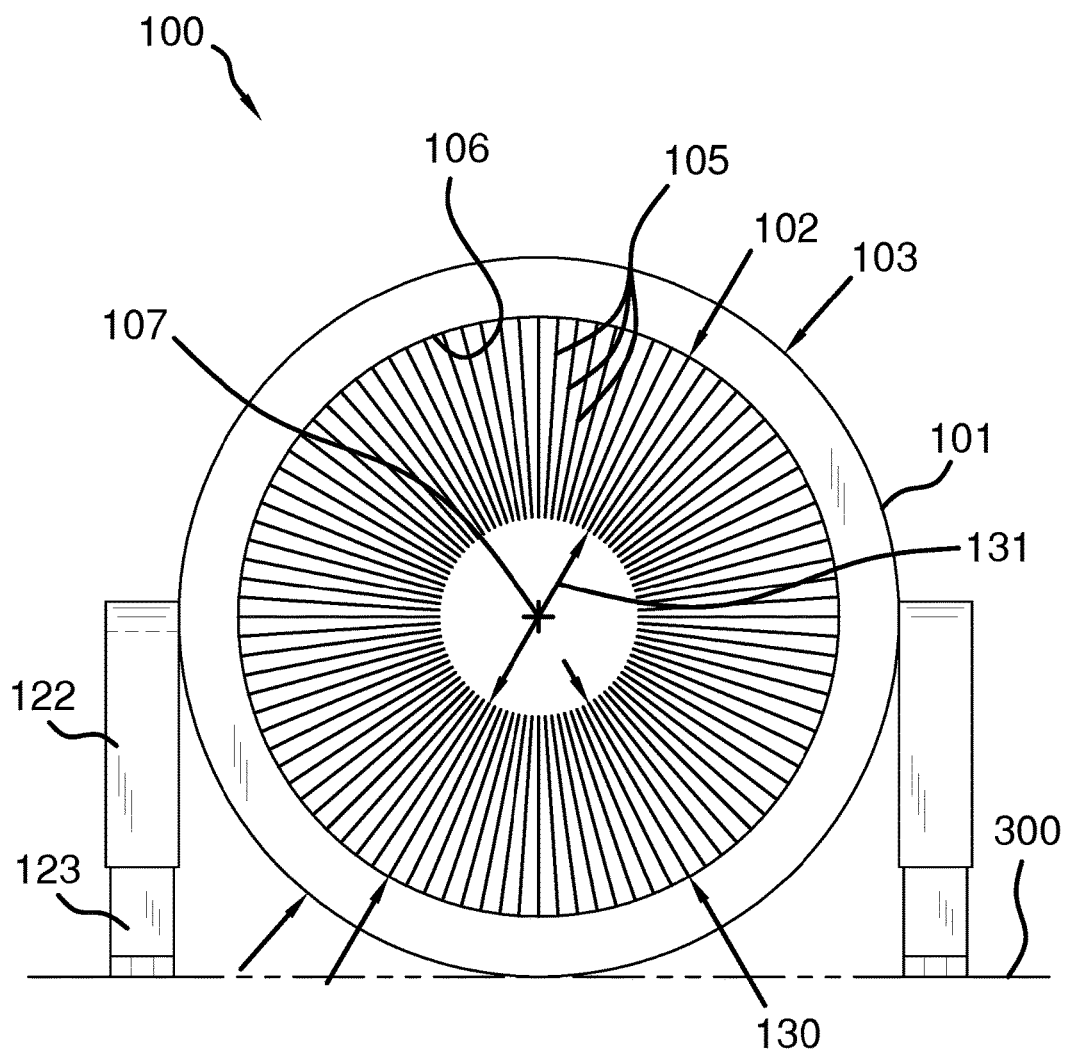
FIG. 1 is a front view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 5.

The pet grooming tunnel 100 (hereinafter invention) comprises a ring member 101 that is further defined with an inner diameter 102, an outer diameter 103, and a width 104. The inner diameter 102 is sized to enable an animal 200 to walk through the ring member 101. The inner diameter 102 of the ring member 101 is adorned with a plurality of brush bristles 105.

Figure 2:
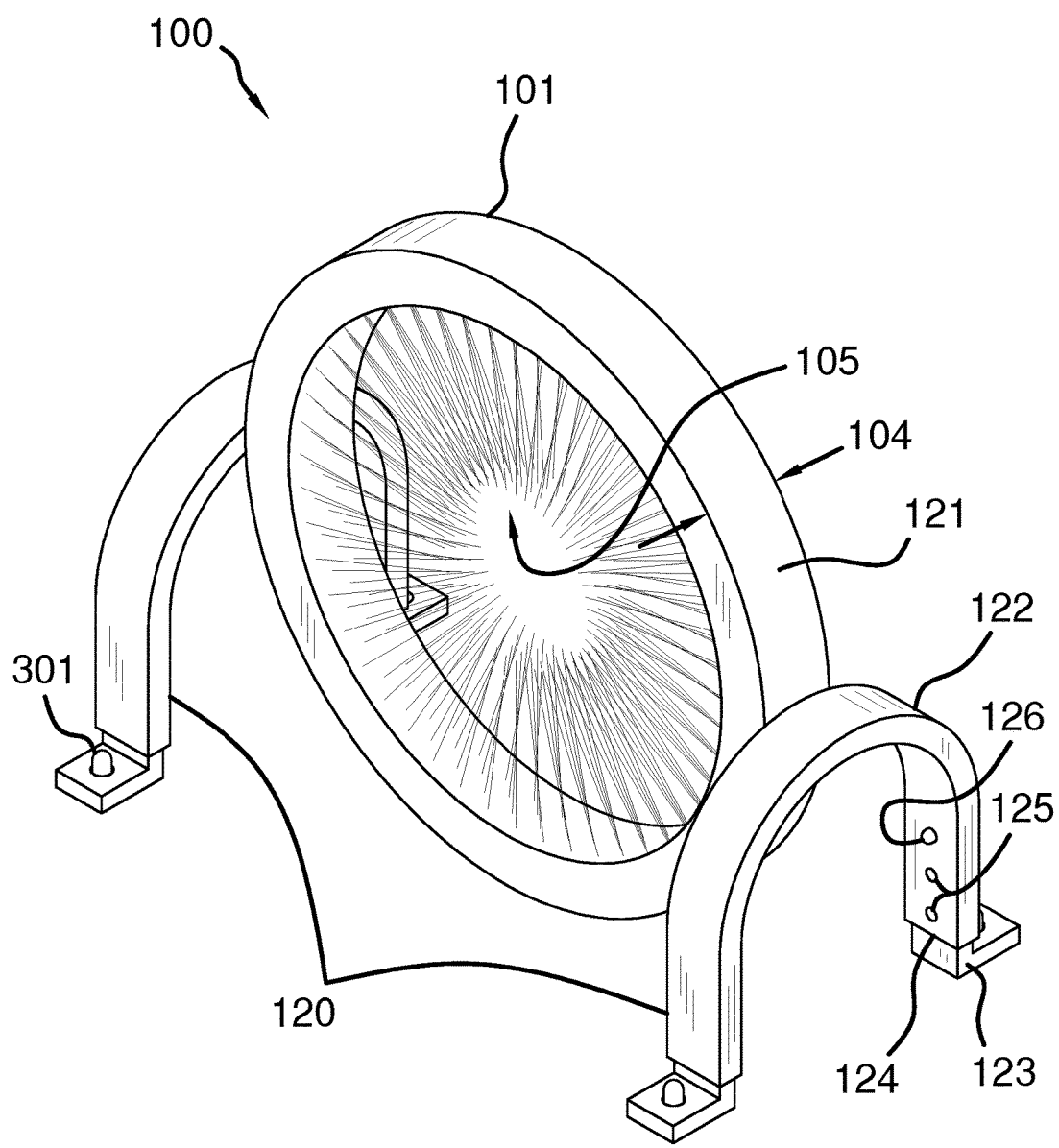
FIG. 2 is a perspective view of an embodiment of the disclosure.
Figure 3:
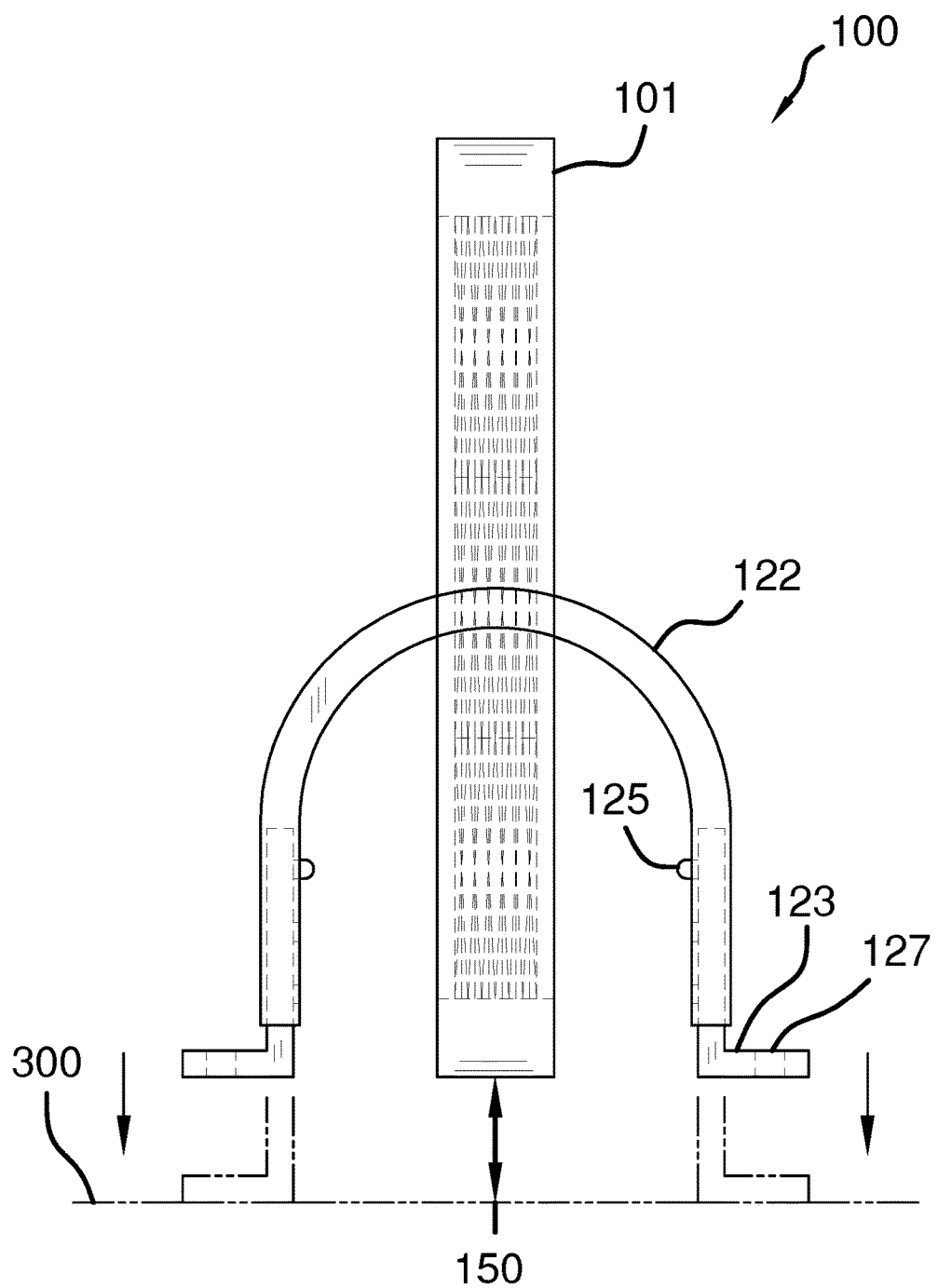
FIG. 3 is a side view of an embodiment of the disclosure.

The plurality of brush bristles 105 are concentrically oriented, and extend from an inner surface 106 of the ring member 101 towards a central axis 107 of the ring member 101. The figures depict two differing embodiments. In FIGS. 1-3, the plurality of brush bristles 105 are linearly aligned with respect to one another and the inner surface 106 of the ring member 101. The plurality of brush bristles 105 are affixed to and extend outwardly from the inner surface 106 of the ring member 101. The plurality of brush bristles 105 may be molded into the ring member 101 in a manner consistent with the manufacture of a brush. The plurality of brush bristles 105 are further defined with a bristle length 130. The bristle length 130 is less than the inner diameter 102. In fact, the plurality of brush bristles 105 form a brush opening 131 that is configured to enable the animal 200 to enter through the invention 100.

Figure 4:
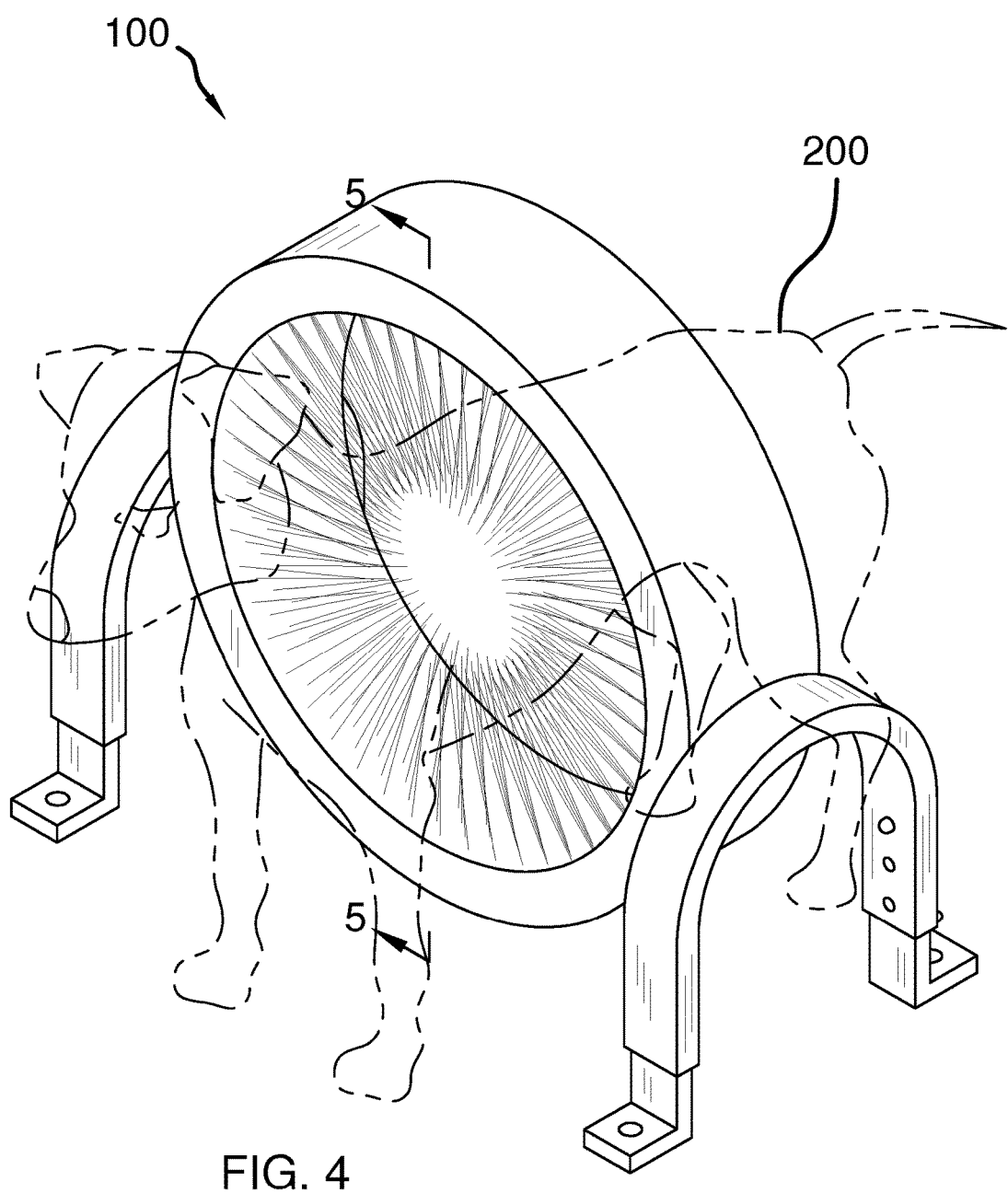
FIG. 4 is a perspective view of an alternative embodiment of the disclosure.
Figure 5:
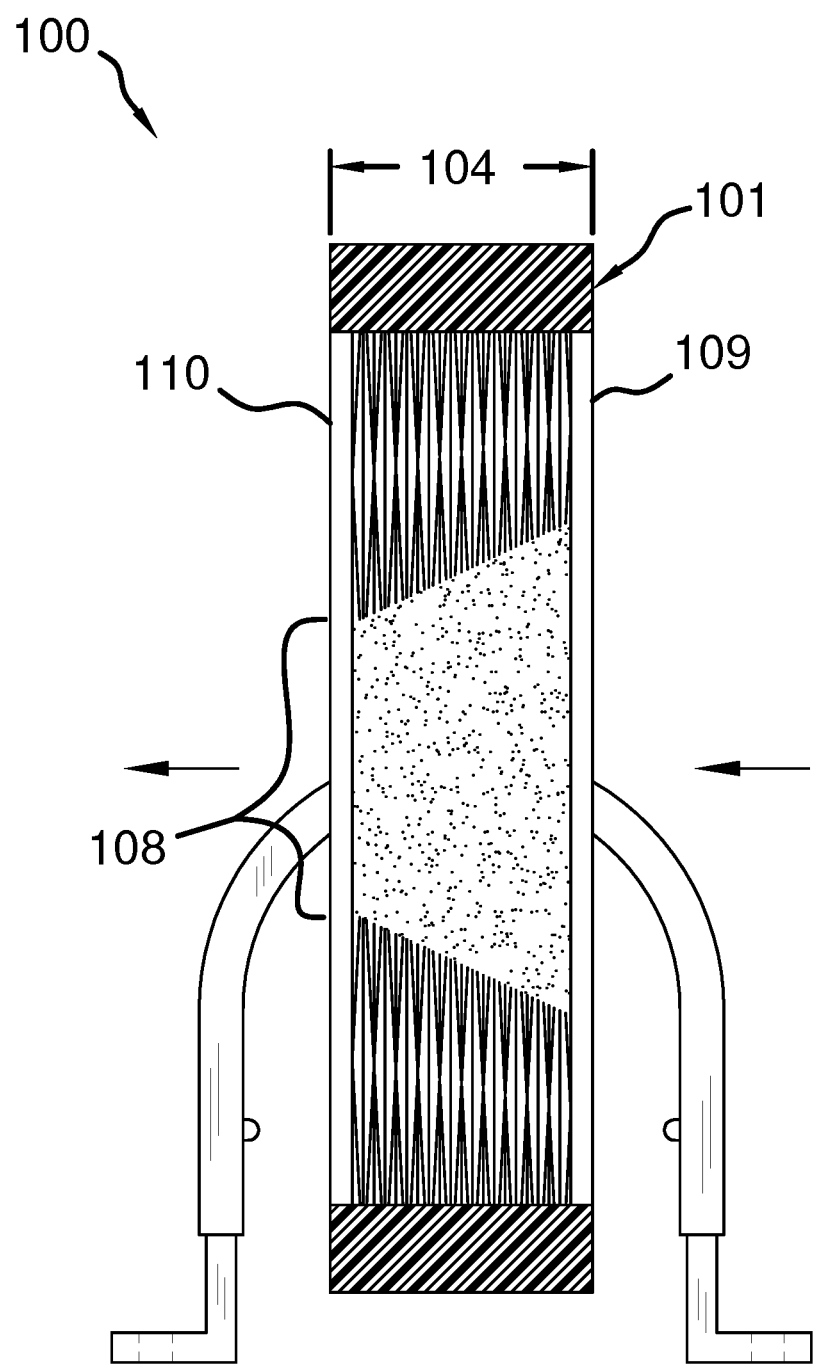
FIG. 5 is a cross-sectional view of an alternative embodiment of the disclosure across line 5-5 in FIG. 4.

In FIGS. 4-5, the plurality of brush bristles 105 form a truncated conical opening 108 as the plurality of brush bristles extend from a first side 109 to a second side 110 forming the width 104 of the ring member 101. The disparity of the two embodiments depicted in FIGS. 1-5 illustrates differing brush characteristics that may be applicable to the animal 200 when in use. In other words, the embodiment of FIGS. 4-5 may work better where the animal 200 has a fur coat; whereas the embodiment of FIG. 103 may be more efficient in brushing the animal 200 where the animal has hair.

The ring member 101 is supported in a vertical orientation. Moreover, the ring member 101 is attached to a pair of support legs 120. The pair of support legs 120 attach to opposing sides of the ring member 101. The ring member 101 is further defined with an outer surface 121. The pair of support legs 120 are affixed to the outer surface 121 of the ring member 101. The pair of support legs 120 are configured to interface with the ground surface 300. The pair of support legs 120 are each further defined as a "U"-shaped bracket 122 that is inverted, and includes telescoping feet 123 that extend downwardly from an opening 124 provided on either side of the "U" shaped bracket 122. The "U"-shaped bracket 122 includes a plurality of pin holes 125. The telescoping feet 123 includes a spring-loaded button 126 that interfaces with the plurality of pin holes 125 in order to raise and lower the ring member 101 with respect to the ground surface 300. In referring to FIG. 3, the telescoping feet 123 can adjust a relative location with respect to the "U" shaped bracket 122 in order to adjust an elevation 150 of the ring member 101 with respect to the ground surface 300.

The ground surface 300 may be outfitted with engagement pegs 301 that secure the telescoping feet 123 thereto.

Engagement holes 127 shall be provided on the telescoping feet 123 in order to interface with the engagement pegs 301. The ring member 101 and the pair of support legs 120 may be made of a plurality of materials comprising plastic, metal, wood, ceramic, carbon fiber composite. The plurality of brush bristles 105 may be made of a plurality of materials comprising hair, nylon, metal, rubber, etc.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A pet grooming device comprising:
a ring member that includes a plurality of brush bristles oriented inwardly;
wherein the ring member is supported in a vertical orientation and is configured to receive an animal there through such that said plurality of brush bristles is configured to brush a fur or hair of said animal;
wherein the ring member is further defined with an inner diameter, an outer diameter, and a width;
wherein the plurality of brush bristles form a truncated conical opening as the plurality of brush bristles extend from a first side to a second side forming the width of the ring member;
wherein the ring member is supported in a vertical orientation;
wherein the ring member is attached to a pair of support legs;
wherein the pair of support legs are each further defined as a "U"-shaped bracket that is inverted, and includes telescoping feet that extend downwardly from an opening provided on either side of the "U" shaped bracket;
wherein the inner diameter is configured to be sized to enable said animal to pass through the ring member;
wherein the ring member is further defined with an inner surface that is adorned with a plurality of brush bristles;
wherein the plurality of brush bristles are concentrically oriented, and extend from the inner surface of the ring member towards a central axis of the ring member;
wherein the plurality of brush bristles are concentrically aligned with respect to one another and the inner surface of the ring member;
wherein the plurality of brush bristles are affixed to and extend outwardly from the inner surface of the ring member;
wherein the plurality of brush bristles are further defined with a bristle length;
wherein the bristle length is less than the inner diameter;
wherein the plurality of brush bristles form a brush opening that is configured to enable the animal to enter through the ring member;
wherein the pair of support legs attach to opposing sides of the ring member;
wherein the ring member is further defined with an outer surface;
wherein the pair of support legs are affixed to the outer surface of the ring member;
wherein the pair of support legs are configured to interface with the ground surface;
wherein the "U"-shaped bracket includes a plurality of pin holes;
wherein the telescoping feet includes a spring-loaded button that interfaces with the plurality of pin holes in order to raise and lower the ring member with respect to the ground surface;
wherein the telescoping feet can adjust a relative location with respect to the "U" shaped bracket in order to adjust an elevation of the ring member with respect to the ground surface;
wherein the ground surface is outfitted with engagement pegs that secure the telescoping feet thereto;
wherein engagement holes are provided on the telescoping feet in order to interface with the engagement pegs.

* * * * *